US012667450B2

(12) United States Patent
Lee et al.

(10) Patent No.: US 12,667,450 B2
(45) Date of Patent: Jun. 30, 2026

(54) ONE-PIECE DENTAL IMPLANT GUIDE PACK BASED ON PHOTOCURING MOLDING

(71) Applicants: JOY INTERNATIONAL CO., Taipei City (TW); Ping-Cheng Lee, Taipei City (TW); Chiao-I Tsai, Taipei City (TW)

(72) Inventors: Ping-Cheng Lee, Taipei City (TW); Chiao-I Tsai, Taipei City (TW)

(73) Assignees: JOY INTERNATIONAL CO., Taipei City (TW); Ping-Cheng Lee, Taipei City (TW); Chiao-I Tsai, Taipei City (TW)

( * ) Notice: Subject to any disclaimer, the term of this patent is extended or adjusted under 35 U.S.C. 154(b) by 686 days.

(21) Appl. No.: 18/056,849

(22) Filed: Nov. 18, 2022

(65) Prior Publication Data

US 2023/0355357 A1      Nov. 9, 2023

(30) Foreign Application Priority Data

May 5, 2022     (TW) .................................. 111117051
May 5, 2022     (TW) .................................. 111204650
(Continued)

(51) Int. Cl.
*A61C 8/00*          (2006.01)
*A61C 13/15*         (2006.01)

(52) U.S. Cl.
CPC .......... *A61C 8/0012* (2013.01); *A61C 8/0018* (2013.01); *A61C 19/004* (2013.01)

(58) Field of Classification Search
CPC ....... A61C 8/0012; A61C 8/0018; A61C 8/00; A61C 19/004; A61C 19/00; A61C 19/003;
(Continued)

(56) References Cited

U.S. PATENT DOCUMENTS 7,322,821 B1 *   1/2008   Lin ........................ A61C 1/084
                                                    433/201.1
7,845,943 B2 *  12/2010   Meitner ................. A61C 1/084
                                                    433/76

FOREIGN PATENT DOCUMENTS

CN           204207868 U   *   3/2015

OTHER PUBLICATIONS

Qiu et al. , Screw Guide, CN 204207868 U, machine translation (Year: 2015).*

* cited by examiner

*Primary Examiner* — Eric J Rosen
*Assistant Examiner* — Mirayda A Aponte
(74) *Attorney, Agent, or Firm* — Workman Nydegger

(57)          ABSTRACT

A one-piece dental implant guide pack based on photocuring molding includes: a guide socket for receiving a photosensitive resin at an outer edge of the guide socket, adjusting and positioning the guide socket by the photosensitive resin which is curable by light; a guide slot formed at a side edge of the guide socket, and having a receiving portion at the bottom; a positioning shaft, having a positioning part and a shaft, and the positioning part being socketed into the guide socket, and the shaft penetrating to the bottom of the guide socket; and at least one positioning part, with an end connected to the guide socket and another end connected to and positioning the positioning shaft. This disclosure facilitates the drilling process of subsequent operations and improves the convenience and accuracy of the implant guide plate and the accuracy of the dental implant surgery.

8 Claims, 15 Drawing Sheets

(30)       Foreign Application Priority Data

Jul. 15, 2022    (TW) .................................. 111126726
Jul. 15, 2022    (TW) ................................ 111207660

(58)  Field of Classification Search
      CPC ......... A61C 1/084; A61C 13/34; B33Y 50/00;
                      A61B 2034/107; A61B 2017/568
      USPC ...................................... 433/173–176, 201.1
      See application file for complete search history.

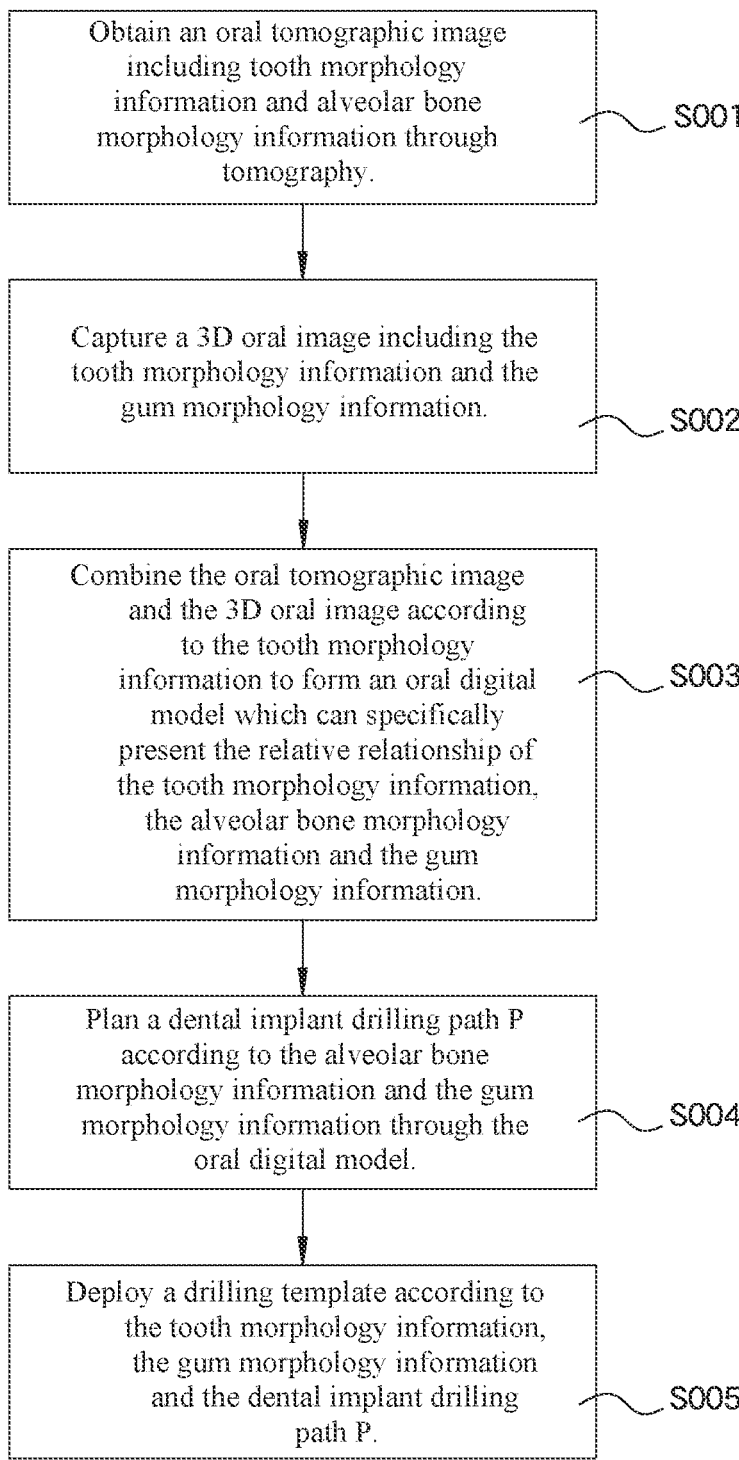

Obtain an oral tomographic image including tooth morphology information and alveolar bone morphology information through tomography.    S001

Capture a 3D oral image including the tooth morphology information and the gum morphology information.    S002

Combine the oral tomographic image and the 3D oral image according to the tooth morphology information to form an oral digital model which can specifically present the relative relationship of the tooth morphology information, the alveolar bone morphology information and the gum morphology information.    S003

Plan a dental implant drilling path P according to the alveolar bone morphology information and the gum morphology information through the oral digital model.    S004

Deploy a drilling template according to the tooth morphology information, the gum morphology information and the dental implant drilling path P.    S005

FIG.1

ONE-PIECE DENTAL IMPLANT GUIDE PACK BASED ON PHOTOCURING MOLDING

BACKGROUND

Technical Field

The present disclosure relates to a one-piece dental implant guide pack based on photocuring molding, and more particularly to a dental implant guide that can fix a guide socket and a positioning shaft in position by a positioning part, so that when the implant guide plate is manufactured, the whole of the positioning guide socket and the positioning shaft can be secured, and after the implant guide plate is manufactured, the positioning part can be slightly cut to remove the positioning shaft, so as to facilitate the accuracy of dental implant surgery.

Description of Related Art

Dental implant surgery is a surgical technique to form a denture by installing an artificial root in order to make up for missing teeth. The artificial root, also known as implant, is implanted into the alveolar bone of a missing tooth by surgery to replace the root of a natural tooth and serve as the foundation of a dental crown. After the alveolar bone and the implant are combined, the dental crown can be installed on the implant, so that a tooth like the natural tooth and having the occlusal force of the natural tooth can be formed. Compared with the conventional bridge denture, the denture formed by the dental implant is more aesthetic and comfortable, and can be used for a long time, so that it is one of the main methods of replacing a missing tooth.

To improve the accuracy and aesthetics of the dental implant, a dental scan or tomography scan is generally used to design the implant position by computer and then a guide plate is formed according to the implant position, so that a drill can be guided by the guide plate to drill a predetermined depth in order to install the implant at the desired position. However, the current production of chair-side guide plates used in the clinic is directly applied on the tooth mold, and a hole is drilled directly in a tooth mold after the desired implant position is planned by the surgeon, and then a positioning column is installed into the hole and a pack is socketed with the periphery of a positioning, and a side of the pack has a fastener, and a photosensitive resin is coated on the adjacent teeth, while the pack and fastener are being glued and light cured, and finally a guide element is assembled to the fastener by removing the positioning column and the pack to form a guide plate However, in the process of drilling a hole in the tooth mold, the drilling path will determine the position and angle of the subsequent dental implant, because the tooth mold only shows the shape of the oral cavity, and the planning of its drilling path mainly relies on the occlusion between teeth. Since it is impossible to know the shape of the bone from the tooth mold, and there is a soft tissue (gum) outside the bone, and the gum thickness of each person is different, and the gum thickness of different parts of the same person is also different, so that a guide plate is generally used. During the process of using the guide plate, it is recommended to cut open the gum, so that dentists can directly see the bone under the gum in order to carry out a safe dental implant and facilitate the subsequent dental implant process. Such arrangement will cause discomfort to the patient and delay the operation schedule. Furthermore, if the bone condition is found to be poor at the expected position and angle of the drilled hole and the dental implant cannot be performed, then subsequent processes cannot be performed, and due to the limited operating space in the oral cavity, it is difficult to directly correct the dental implant position based on the surgical experience. Therefore, the planning of the drilling path is an extremely important step in the pre-operation of the dental implant. With no precise planning, judgment or calibration, the subsequent dental implant process will be affected adversely.

In addition, the conventional dental implant guide pack is generally a two-piece device comprised of a pack and a positioning column, and the positioning column is passed and assembled into the pack, the positioning column is inserted into the drilled hole of the tooth mold, and the direction and position of the pack are adjusted, and then a photosensitive resin is coated onto the adjacent teeth, while the pack is adhered and light cured, so as to form a guide plate after removing the positioning column;

However, in the configuration of the dental implant guide pack, when the photosensitive resin is adhered, the combining force between the positioning column and the pack is often limited, resulting in vibration or displacement during the adhesion process. Therefore, it is necessary to be very careful during the process and to press or fix the dental implant guide pack, which will make the manufacturing process extremely inconvenient, and it is easy to cause a deviated angle of the pack, and the subsequent drilling of the dental implant cannot be performed accurately, so that the dental implant may have errors.

In view of the aforementioned problems of the related art, the present discloser conducted extensive research and experiment on the dental implant guide pack in hope of providing a better solution to solve the aforementioned problems, and finally invented the dental implant guide pack in accordance with this disclosure to overcome the problems of the related art.

SUMMARY

Therefore, it is a primary objective of the present disclosure to provide a one-piece dental implant guide pack based on photocuring molding overcome to overcome the aforementioned problems. The one-piece dental implant guide pack includes: a guide socket, for receiving a photosensitive resin at an outer edge and adjusting and positioning the guide socket by the photosensitive resin, and the photosensitive resin being cured by light; the guide socket being configured to be in a substantially tubular shape and having an opening formed at the top of the guide socket, and a guide slot formed on a side edge of the guide socket and communicated with the opening, and the bottom of the guide slot having a receiving portion; a positioning shaft, having a positioning part and a shaft, and the positioning shaft being socketed into the guide socket, and the shaft penetrating to the bottom of the guide socket; and at least one positioning part, with an end connected to the guide socket and another end connected to and positioning the positioning shaft.

In the one-piece dental implant guide pack based on photocuring molding of this disclosure, the guide socket further includes at least one positioning element disposed at an outer edge of the guide socket.

In the one-piece dental implant guide pack based on photocuring molding of this disclosure, the positioning element is in a substantially convex arc shape.

In the one-piece dental implant guide pack based on photocuring molding of this disclosure, there are plural positioning elements arranged in an array at the outer edge of the guide socket.

In the one-piece dental implant guide pack based on photocuring molding of this disclosure, the guide socket is in a substantially round tubular shape.

In the one-piece dental implant guide pack based on photocuring molding of this disclosure, the positioning part is in a substantially round tabular shape.

In the one-piece dental implant guide pack based on photocuring molding of this disclosure, the positioning part is in a substantially stripe shape.

In the one-piece dental implant guide pack based on photocuring molding of this disclosure, the positioning part is configured to be opposite to an end of the guide socket and coupled to a side edge of the positioning part.

In the one-piece dental implant guide pack based on photocuring molding of this disclosure, the shaft comprises a receiving element radially installed to the shaft, and at least one connecting part disposed between the top of the receiving element and the bottom of the guide socket.

In the one-piece dental implant guide pack based on photocuring molding of this disclosure, the receiving element is in a substantially disk shape.

From the description above, this disclosure obviously has the following advantages and effects:

In this disclosure, the guide socket and the positioning shaft are connected through the positioning part to form a one-piece dental implant guided pack, so that the direction and position of the whole piece of the guide socket and the positioning shaft can be secured stably when the implant guide plate is made, and after the implant guide plate is made, the positioning shaft can be removed by slightly cutting the positioning part and the connecting part with a dental tool. Obviously, the present disclosure can facilitate the drilling process of the subsequent operation and improve the convenience and accuracy of making the implant guide plate as well as the accuracy of the dental implant surgery.

BRIEF DESCRIPTION OF THE DRAWINGS

FIG. 1 is a flow chart of this disclosure;

DESCRIPTION OF THE EMBODIMENTS

Figure 2:
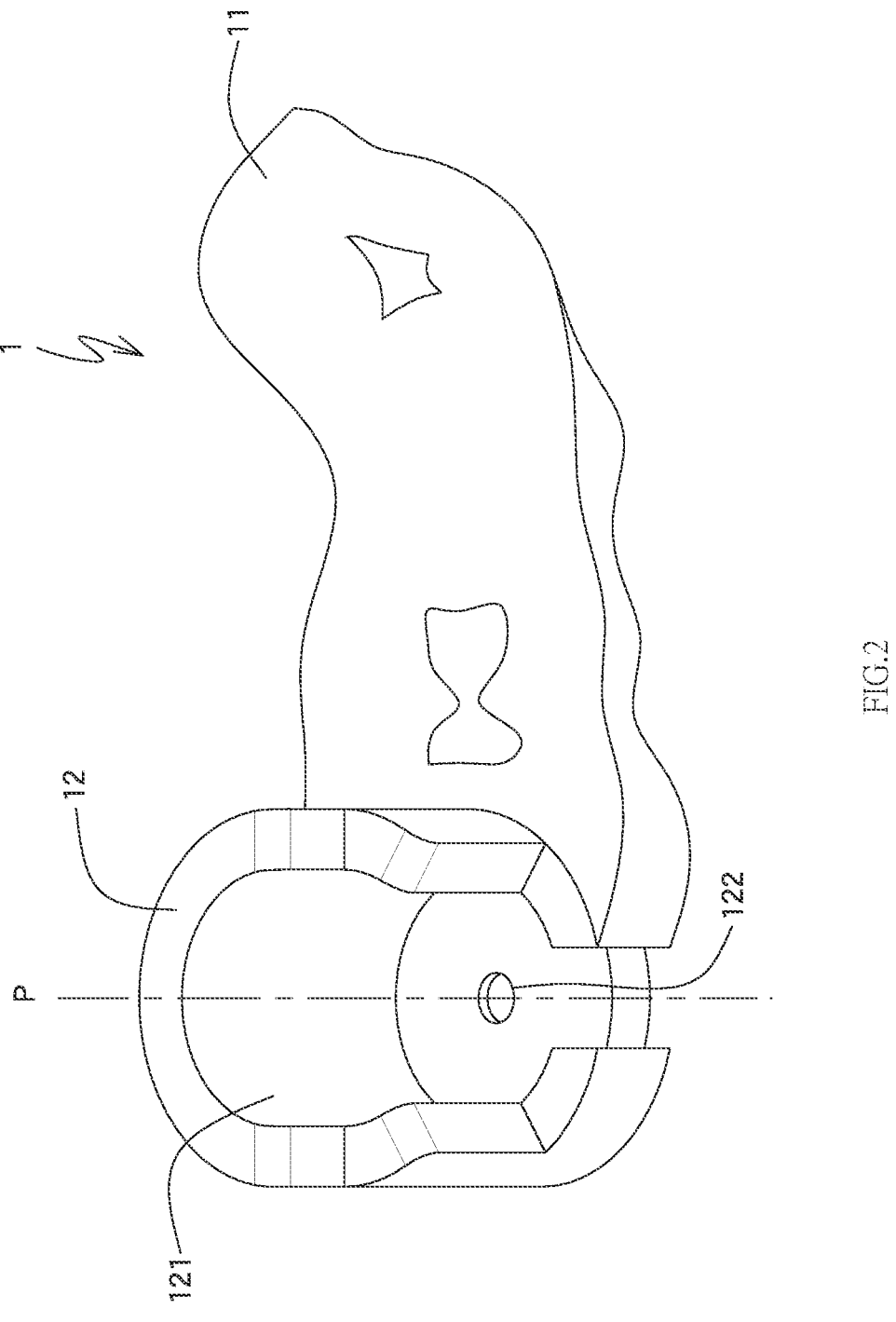
FIG. 2 is a perspective view of a drilling template prepared in accordance with this disclosure.

This disclosure will now be described in more detail with reference to the accompanying drawings that show various embodiments of this disclosure. It is intended that the embodiments and drawings disclosed herein are to be considered illustrative rather than restrictive.

This disclosure is directed to a one-piece dental implant guide pack based on photocuring molding, its implementation, features and effects, which are described in detail by means of the following preferred embodiments accompanied by related drawings to make it easier for the examiner to understand the technical characteristics of this disclosure.

This disclosure relates to a one-piece dental implant guide pack based on photocuring molding, which is applicable to the conventional dental implant process or the manufacture of its implant guide plate. In this disclosure, a method of making a drilling template according to a dental implant path as shown in FIG. 1 is used, and a dental implant path calibration method can further be used together, but this example is to be considered illustrative, rather than restrictive.

The method of making a drilling template 1 according to a dental implant path includes the following steps:

S001: Obtain an oral tomographic image including tooth morphology information and alveolar bone morphology information through tomography; wherein the tomography usually refers to computerized tomography (CT) which accurately presents the tooth morphology information and the alveolar bone morphology information of a patient's oral cavity; the tooth morphology information includes the specific position, orientation, shape and other information of the tooth; and the alveolar bone morphology information includes the specific shape, position, density and other information of the alveolar bone below the teeth, which can be accurately presented by 3D oral tomographic images.

S002: Capture a 3D oral image including the tooth morphology information and the gum morphology information; wherein the 3D oral image can be captured by scanning the patient's oral cavity by an oral cavity scanner in an embodiment or by the traditional way of preparing a dental plaster/cast (or a tooth mold 2) in another embodiment to create the 3D oral image through 3D scan with a 3D scanning device; and the captured 3D oral image includes the tooth morphology information and the gum morphology information of the patient's oral cavity, and the tooth morphology information includes specific dental information such as the position and shape of the exposed teeth, and the gum morphology information includes the position and shape of the gum exposed in the oral cavity.

S003: Input the oral tomographic image and the 3D oral image into a computer. Since both of the oral tomographic image and the 3D oral image have the tooth morphology information and include the specific shape and position of the teeth, therefore after the computer is loaded, an application program is executed to combine the oral tomographic image and the 3D oral image according to the tooth morphology information, so as to form an oral digital model which can specifically present the relative relationship of the tooth morphology information, the alveolar bone morphology information and the gum morphology information.

S004: Plan a dental implant drilling path P in the computer application program according to the alveolar bone morphology information and the gum morphology information through the oral digital model, the computer software, or the dentist's professional judgment.

S005: Deploy a drilling template 1 corresponding to a guide groove 121 of the dental implant drilling path P as shown in FIG. 2 according to the tooth morphology information, the gum morphology information and the dental implant drilling path P. In a specific embodiment, the drilling template 1 can be created in the computer, and drawn automatically according to the alveolar bone morphology information, the gum morphology information and the dental implant path by computer software, or designed manually, so as to generate a drilling template image, and the drilling template image can be a 3D model file used for creating the drilling template 1. In an embodiment, the drilling template image is inputted into a 3D printer, and the drilling template 1 can be made by 3D printing.

As to the structural configuration of the drilling template 1 as shown in FIG. 2, the drilling template 1 has a connecting part 11, and a guide connecting part 12 provided for connecting the connecting part 11, and the connecting part 11 corresponds to at least one part of the tooth morphology information or the gum morphology information, and the guide connecting part 12 is provided with the guide groove 121, and the bottom of the guide groove 121 is provided with a guide hole 122 corresponding to the dental implant drilling path P.

Figure 3:
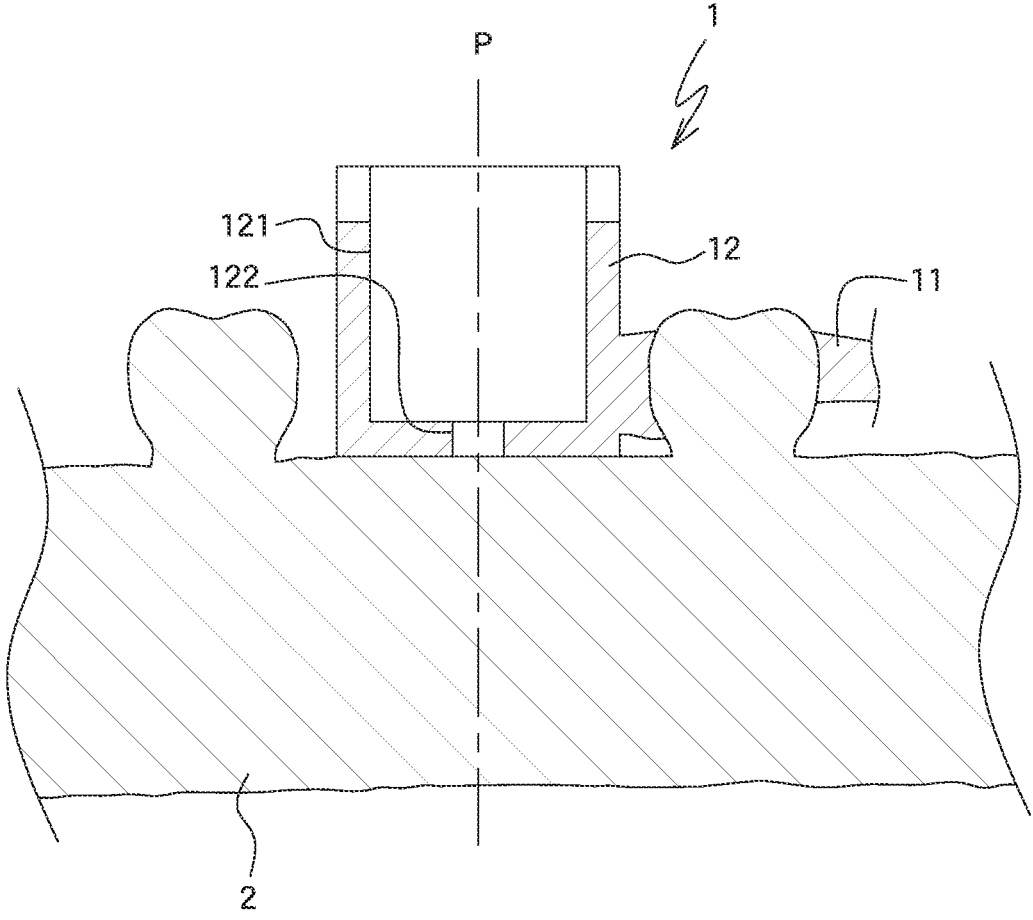
FIG. 3 is a cross-sectional view of the drilling template placed at a tooth mold in accordance with this disclosure.

In FIG. 3, the dentist can place the drilling template 1 directly on the tooth mold 2, and uses a drilling device (not shown in the figure) guided by the guide groove 121 to drill a hole 21 toward the tooth mold 2 guided by the guide hole 122, so that the hole 21 formed in the tooth mold 2 can fully conform to the dental implant drilling path P as planned to facilitate an the accurate implementation of the implant guide plate in subsequent operations and improve the accuracy of the dental implant surgery.

Figure 4:
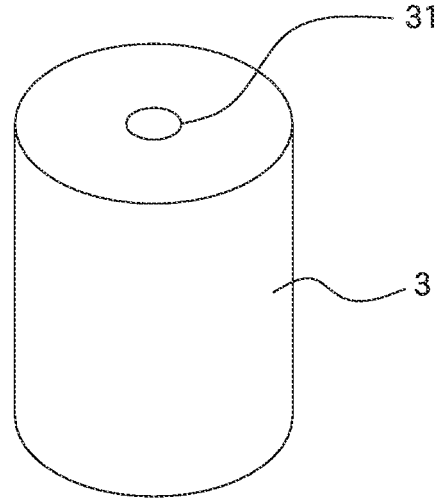
FIG. 4 is a perspective view of an examination model of this disclosure.
Figure 5:
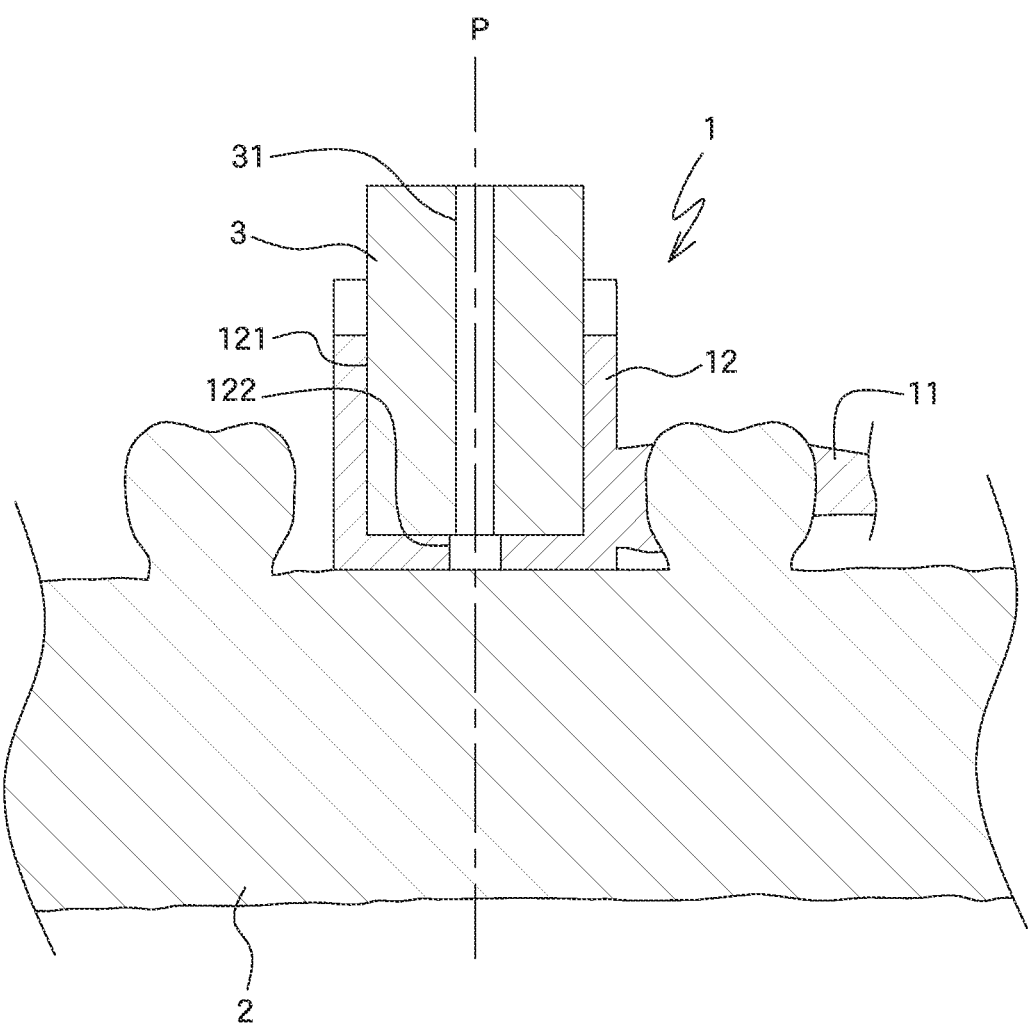
FIG. 5 is a cross-sectional view of the drilling template of FIG. 3 placed into the examination model in accordance with this disclosure.
Figure 6:
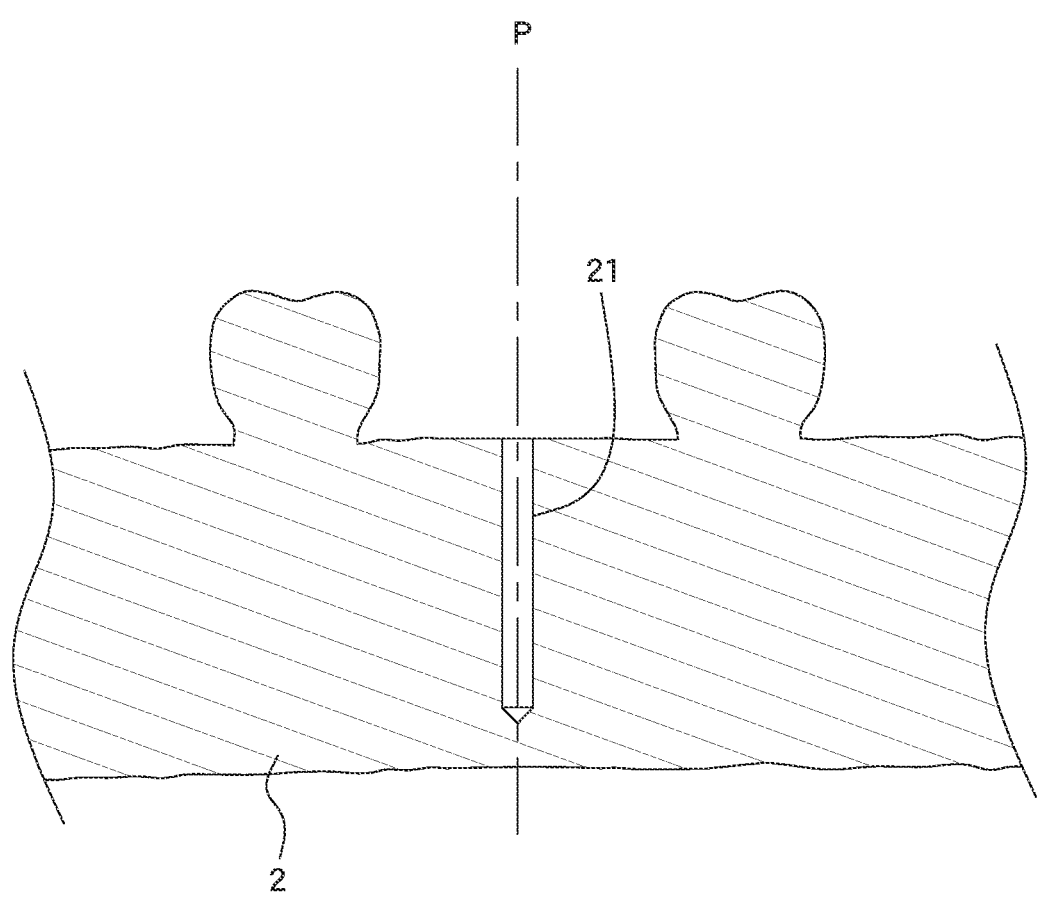
FIG. 6 is a cross-sectional view showing a hole drilled into the tooth mold according to a dental implant drilling path of this disclosure.

To verify whether the hole 21 conforms to the dental implant drilling path P as planned, this disclosure further provides a dental implant path calibration method, wherein the drilling template 1 is placed on the tooth mold 2; and an examination model 3 having a calibration hole 31 is placed into the guide groove 121 of the drilling template 1 as shown in FIGS. 4 and 5, and the calibration hole 31 is provided to calibrate and verify the dental implant drilling path P. In an embodiment, the examination model 3 corresponds to the outer contour of the drilling device and its calibration hole 31 is configured to be correspondive to the drill of the drilling device, and users can verify the dental implant drilling path P by placing the examination model 3 in the guide groove 121, and then guide the drilling device into the guide groove 121 of the drilling template 1 directly as shown in FIG. 6 or indirectly after take out the examination model 3 in order to drill the hole 21 corresponding to the dental implant drilling path P in the tooth mold 2.

Figure 7:
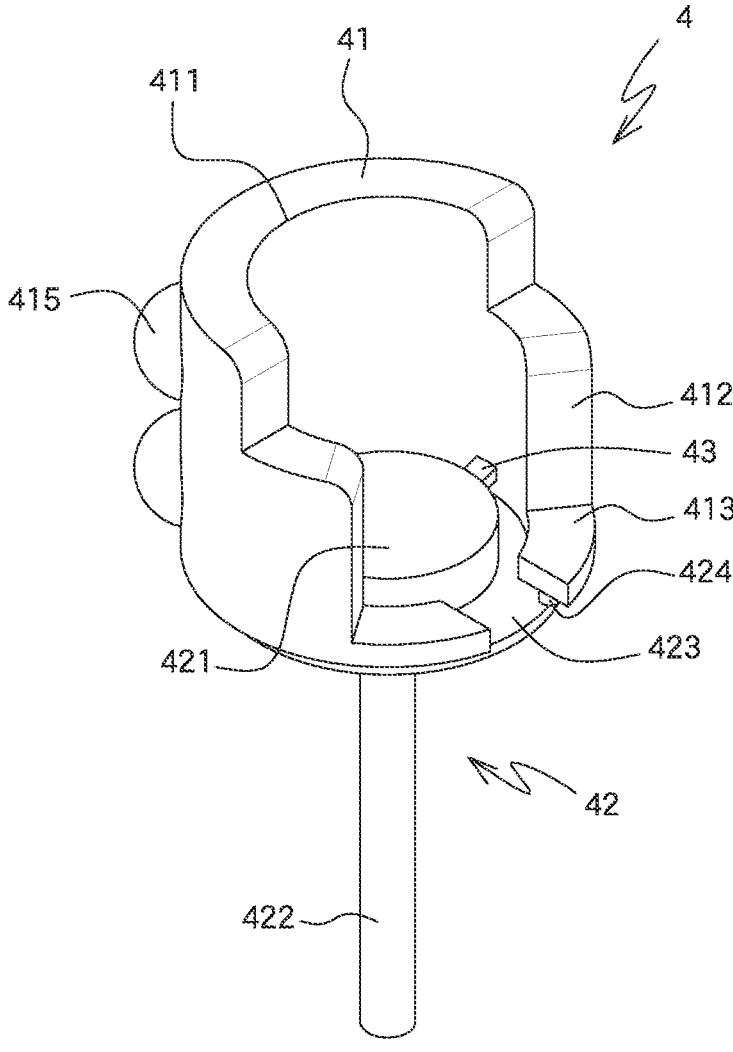
FIG. 7 is a perspective view of a guide pack of this disclosure.
Figure 8:
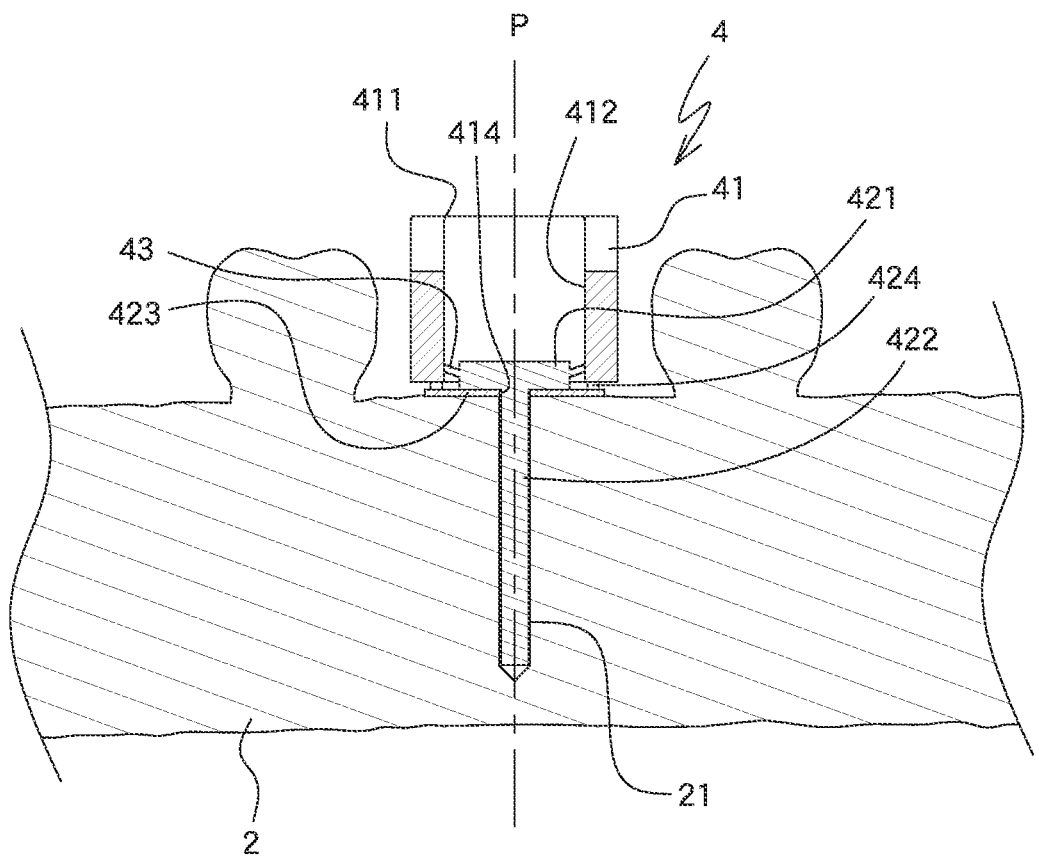
FIG. 8 is a cross-sectional view showing the guide pack installed to the hole of the tooth mold in accordance with this disclosure.
Figure 9:
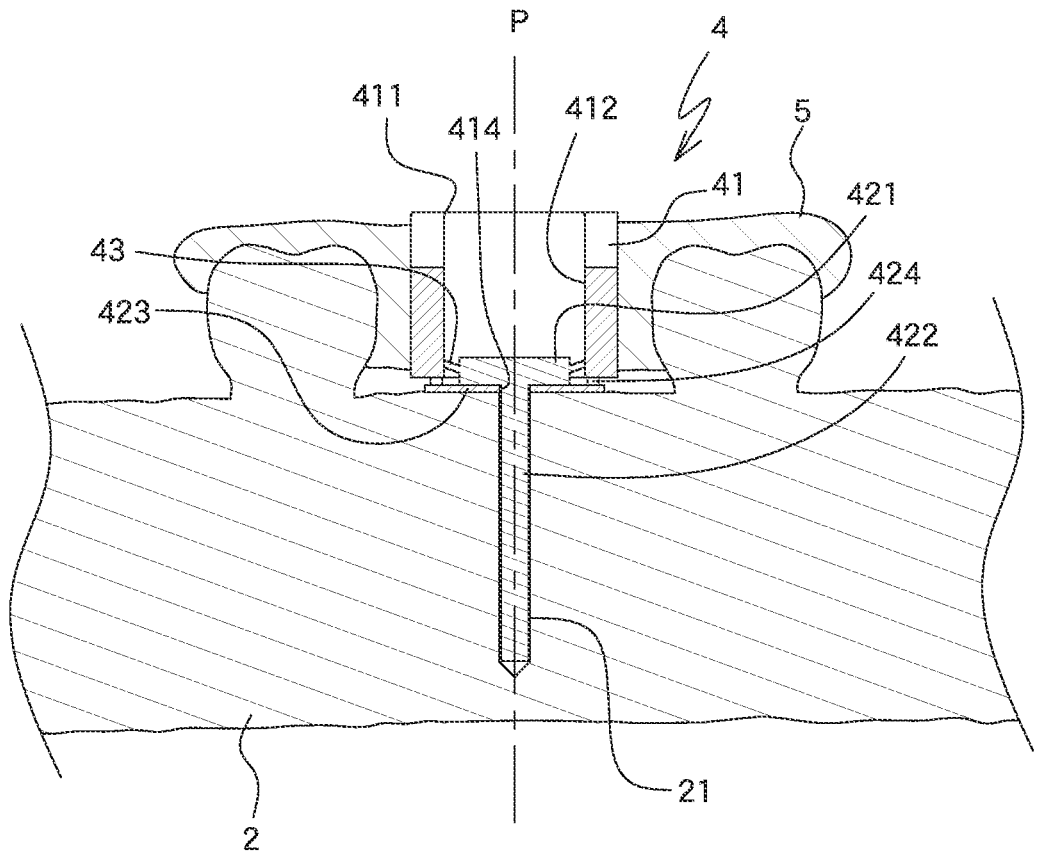
FIG. 9 is a cross-sectional view showing the setting of a photosensitive resin based on the configuration as depicted in FIG. 8.

As described above, the method of this disclosure can accurately drill the hole 21 on the tooth mold 2 according to a properly planned dental implant drilling path P, and produce the implant guide plate by the traditional method. In the method of installing the dental implant guide pack based on photocuring molding 4 in accordance with this disclosure, the hole 21 is drilled on the tooth mold 2, and installed with a guide pack 4 as shown in FIG. 7. The guide pack 4 has a guide socket 41 in a substantially tubular shape with an opening 411 formed at the top of the guide pack 4, and a guide slot 412 formed at a side edge of the guide socket 41 and communicated with the opening 411, and the bottom of the guide slot 412 is provided with a receiving portion 413, and the guide socket 41 is provided with a positioning shaft 42, and the positioning shaft 42 includes a cap part 421 and a shaft 422, and the cap part 421 is socketed into the guide socket 41, and the shaft 422 is penetrated to the bottom of the guide socket 41, and as shown in FIG. 8, the shaft 422 is assembled to the hole 21 of the tooth mold 2, and at least one positioning part 43 is disposed between the guide socket 41 and the cap part 421. The positioning part 43 has an end connected into the guide socket 41 and another end connected to and positioning the positioning shaft 42. Specifically, the positioning part 43 is in a substantially stripe shape, and an end of the positioning part 43 opposite to the guide socket 41 is connected to a side edge of the cap part 421. This is just an example for illustration, but not for limiting the scope of this disclosure. With the positioning part 43, the positioning shaft 42 and the guide socket 41 are configured to be one-piece. In order to facilitate the configuration between the positioning shaft 42 and the guide socket 41, the guide socket 41 is designed in a substantially round tubular shape in an embodiment, and the cap part 421 is designed in a substantially round tubular shape for convenient assembly and formation. In a preferred embodiment, in order to facilitate the installation of the tooth mold 2, the overall angular configuration of the guide pack 4, and the convenience of subsequent drilling, the shaft 422 further has a receiving element 423 installed radially. The receiving element 423 has a substantially disk shape with an opening 414, as depicted in FIGS. 8-9. At least one connecting part 424 is disposed between the top of the receiving element 423 and the bottom of the guide socket 41 for supporting the receiving element 423. In this way, when the guide pack 4 is placed onto the tooth mold 2, the receiving element 423 abuts against the tooth mold 2 to facilitate adjusting the guiding direction of the guide pack 4.

Figure 10:
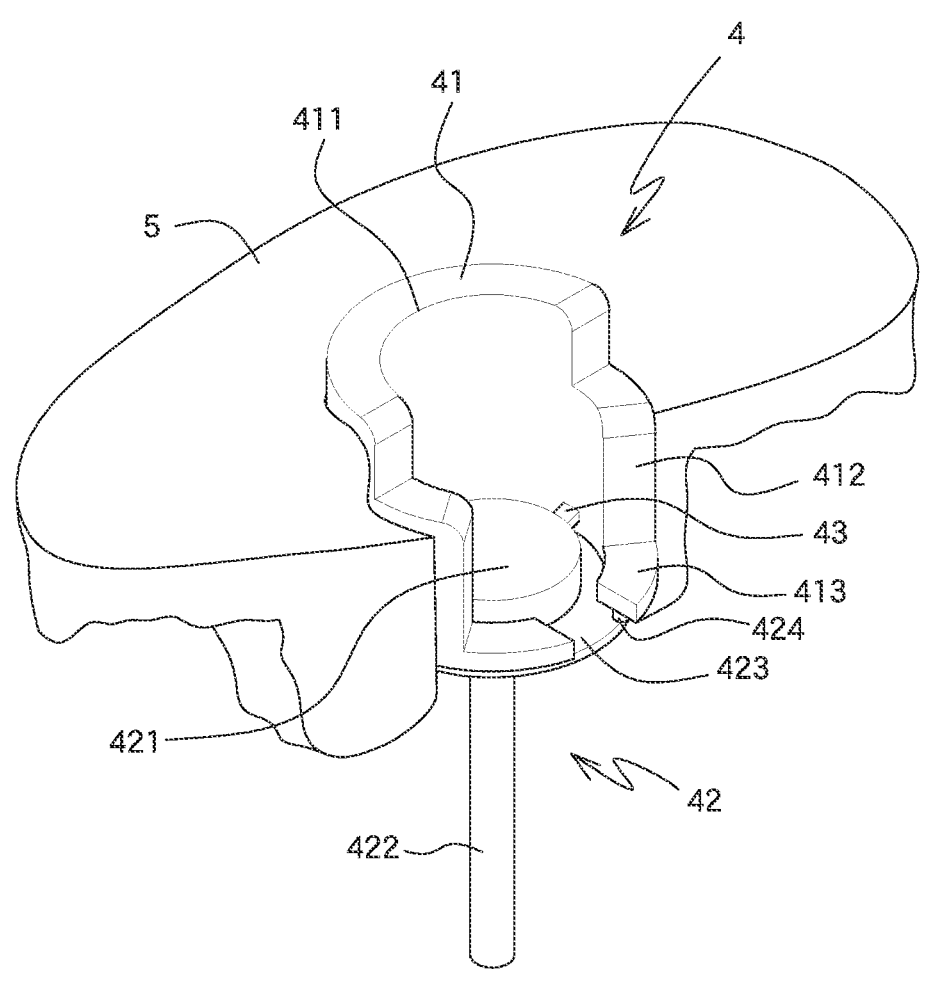
FIG. 10 is a perspective view showing the removal of the photosensitive resin together with the guide pack based on the configuration as depicted in FIG. 9.

In FIGS. 9 and 10, a photosensitive resin 5 is provided for connecting the outer edge of the guide socket 41 with and the tooth mold 2 to calibrate and position the guide socket 41, wherein the photosensitive resin 5 is light cured, that is a photosensitive material of the photosensitive resin 5 is irradiated by the light with a specific wavelength (such as ultraviolet light) to change the properties of the photosensitive material and cure the photosensitive resin 5. The aforementioned material and curing method are prior arts, and thus will not be described here. Since the photosensitive resin 5 has viscosity and plasticity, it can be attached to the guide socket 41 and the tooth mold 2 by plastic molding, so as to define the relative relationship of the surrounding contour between the guide socket 41 and the tooth mold 2. During the aforementioned process, the positioning shaft 42 and the guide socket 41 are of one piece, so that when the photosensitive resin 5 is attached to the outer edge of the guide socket 41 and the tooth mold 2 to calibrate and position the guide socket 41, vibration or separation will not occur between the positioning shaft 42 and the guide socket 41, and the guiding direction of the guide socket 41 can be ensured in order to insert and position the positioning shaft 42 into the hole 21, and conform to the dental implant drilling path P as planned. In order to improve the adhesiveness between the photosensitive resin 5 and the guide socket 41, at least one positioning element 415 is installed at the outer edge of the guide socket 41 in accordance with a preferred embodiment, or the positioning element 415 is designed in a convex arc shape and comes with a plural quantity arranged in an array at the outer edge of the guide socket 41 in accordance with another embodiment, so as to make it easier to attach the photosensitive resin 5 to the guide socket 41 during the plastic shaping process.

Figure 11:
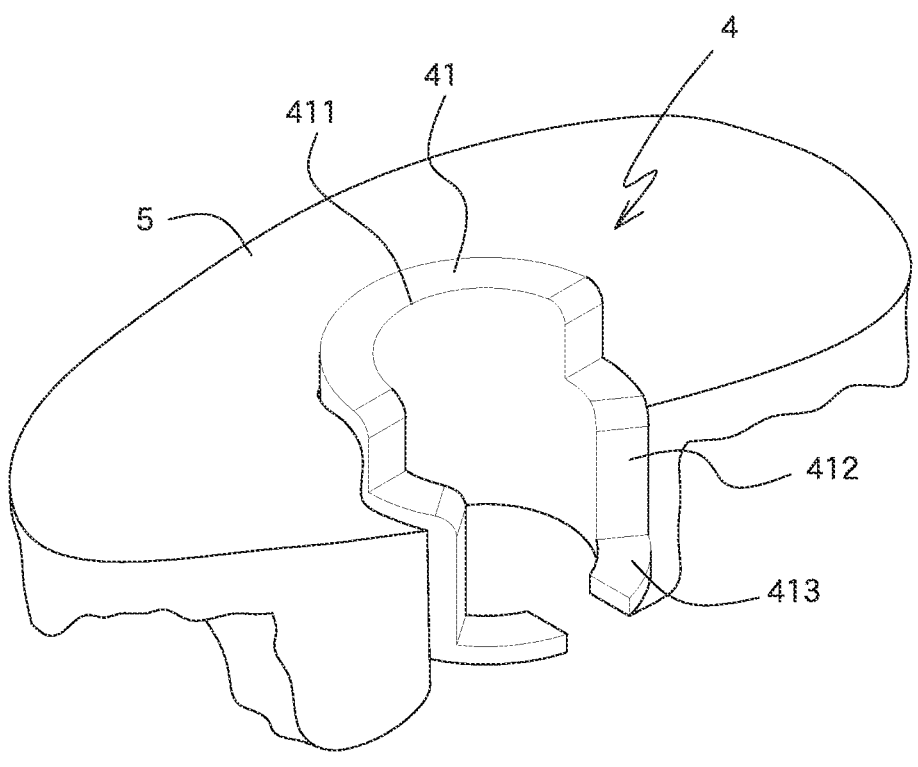
FIG. 11 is a perspective view of an implant guide plate produced after removing a positioning shaft in accordance with this disclosure.

As described above, after the photosensitive resin 5 sufficiently fixes the guide socket 41 into position, a preliminary photocuring process is carried out, and as shown in FIG. 10, the photosensitive resin 5 together with the guide pack 4 are removed, and then processed with sufficient photocuring for a complete photocuring, and the photosensitive resin 5 will no longer be shaped by force. At this time, it is necessary to remove the positioning shaft 42, so that the user can use a dental high-speed hand tool to work with an elongated diamond drill to break the positioning element 415 and the connecting part 424 in order to release the positioning relationship between the positioning shaft 42 and the guide socket 41 and facilitate the removal of the whole positioning shaft 42 as shown in FIG. 11, and form the implant guide plate.

Figure 12:
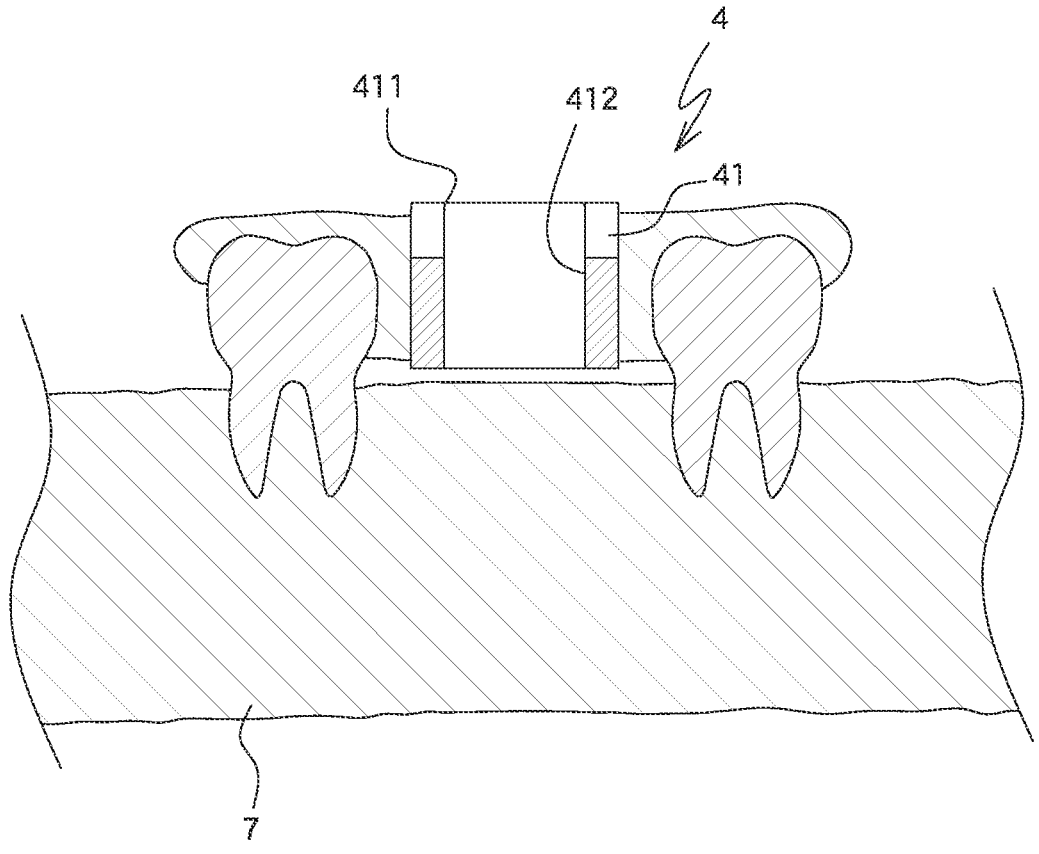
FIG. 12 is a cross-sectional view showing the position of the implant guide plate installed to a patient's oral cavity to perform a dental implant in accordance with this disclosure.
Figure 13:
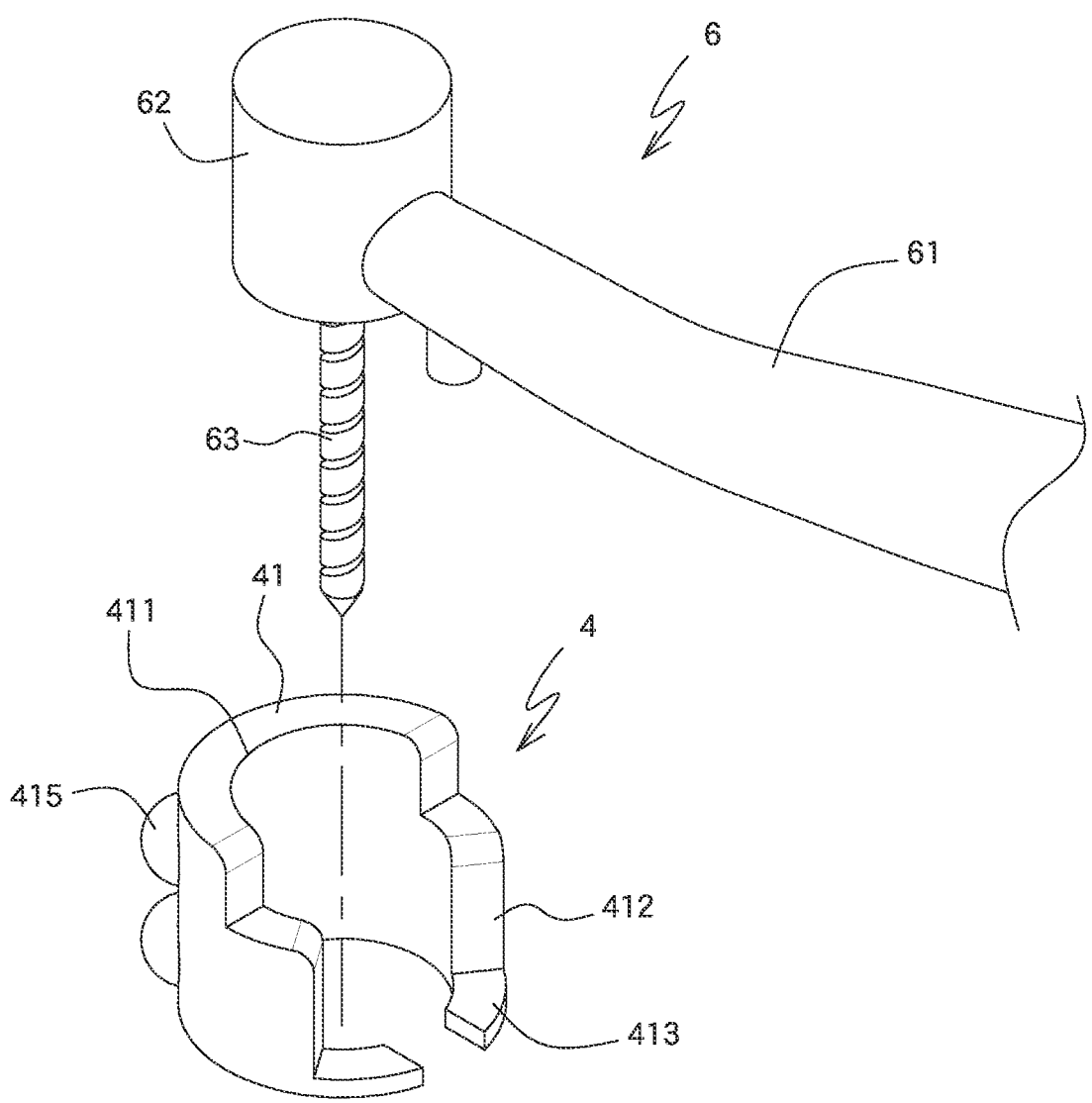
FIG. 13 is a perspective view showing a guide socket and a hand tool of this disclosure.
Figure 14:
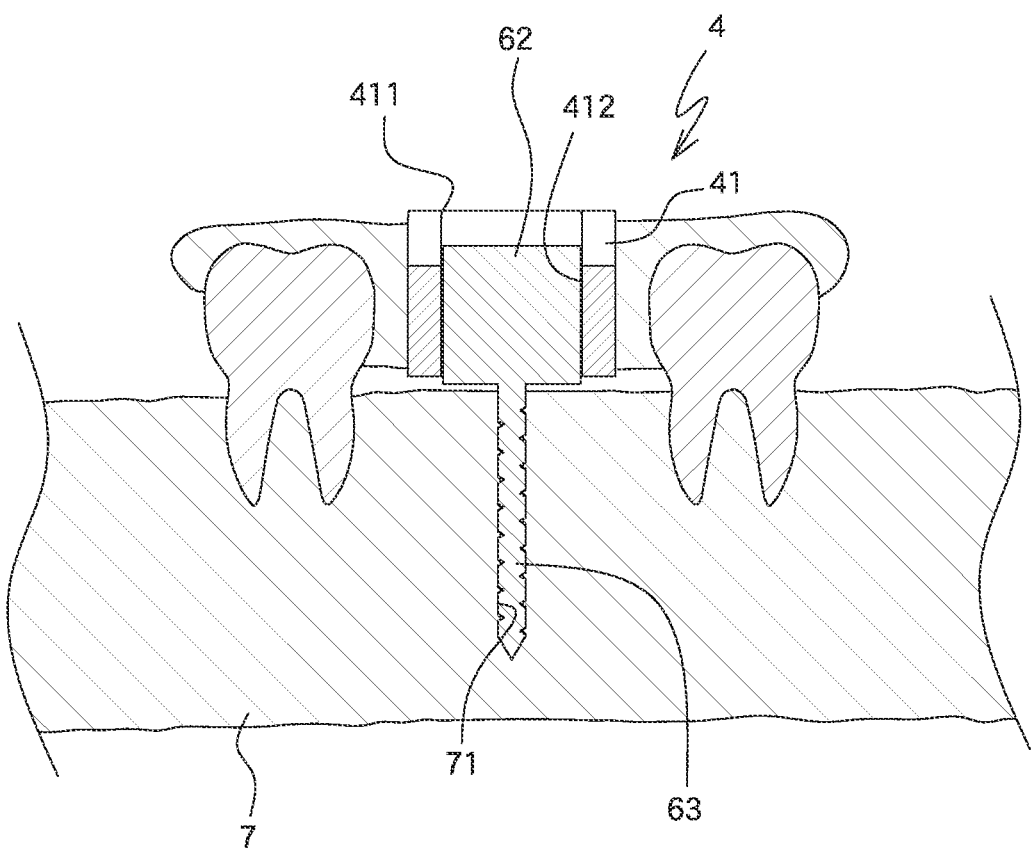
FIG. 14 is a cross-sectional view showing the drilling of a patient's alveolar bone by guiding the hand tool through the guide socket in accordance with this disclosure.
Figure 15:
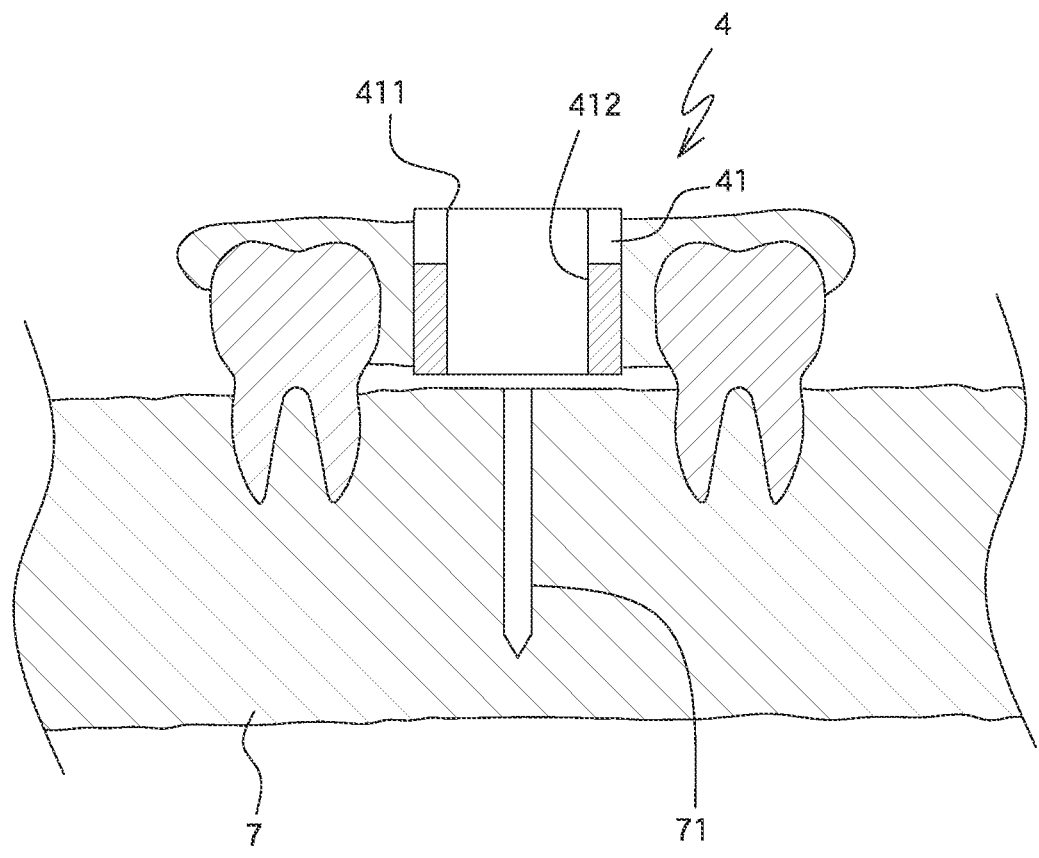
FIG. 15 is a cross-sectional view showing the configuration as depicted in FIG. 14 after the dental implant surgery is completed.

In FIG. 12, the manufactured implant guide plate is placed on the tooth mold 2 and corresponding to the patient's oral cavity. At this time, the position that the guide socket 41 points at along the axial direction is the position that the hole should be drilled corresponding to the patient's alveolar bone 7 during the dental implant, which is equivalent to the planned dental implant drilling path P as described above. In FIGS. 13 and 14, drilling can be performed by the appropriate hand tool 6 equipped to the guide socket 41. Specifically, the hand tool 6 includes a guide arm 61, and an end of the guide arm 61 is provided with a guide base 62, and the bottom of the guide base 62 is provided with a drill bit 63, and the guide base 62 is socketed into the guide socket 41, wherein the guide socket 41 is in a substantially round tubular shape, so that the guide base 62 is in also in a substantially round tubular shape, and the outer diameter of the guide base 6 corresponds to the inner diameter of the guide socket 41, and the guide base 62 can only be displaced axially in the guide socket 41. The bottom of the guide base 62 is limited by the receiving portion 413, such that the bottom of guide arm 61 can abut against the receiving portion 413, and the drill bit 63 can be extended to the bottom of the guide socket 41 to drill the alveolar bone 7 to form a slotted hole 71. The guide arm 61 is configured to be corresponsive to the guide slot 412, so that the hand tool 6 can be displaced along the axial direction of the guide socket 41 through the guide arm 61 and the guidance of the guide slot 412. The horizontal width of the guide slot 412 is equal to or slightly greater than the length of the guide arm 61 to facilitate the dentist to adjust the operation of the hand tool 6 for drilling. When the width of the guide slot 412 is greater than the length of the guide arm 61, the dentist can slightly turn the hand tool 6 in the perpendicular to the guide socket 41 to improve the convenience of the drilling by the dentist during the surgery. Since the guide base 62 is still limited in the guide socket 41 when the hand tool 6 rotates in the aforementioned rotation direction, it will not cause any deviation to the drilling. As shown in FIG. 15, the implant guide plate can be removed, so that the subsequent dental implant process can be performed.

Therefore, the oral digital model is formed by the oral tomographic image and 3D the oral image according to the tooth morphology information to present the relative relationship of the tooth morphology information, the alveolar bone morphology information and the gum morphology information, borrowing. This disclosure is conducive to the accurate analysis and planning of the dental implant drilling path P, and the drilling template 1 is deployed such that the drilling for the tooth mold 2 can conform to the planned dental implant drilling path P. Accompanied with the setting of one-piece guide pack 4 of this disclosure, the dental implant guide pack 4 can be installed correctly and the implant guide plate can be manufactured accordingly to allow the hand tool 6 to pass through the dental implant guide pack 4 during subsequent dental implant surgery. The hand tool 6 can drill the patient's gum with the guidance of the dental implant guide pack 4 according to the dental implant drilling path P as planned, so as to improve the accuracy of the dental implant surgery.

What is claimed is:

1. A one-piece dental implant guide pack based on photocuring molding, comprising:

a guide socket, the guide socket receiving a photosensitive resin at an outer edge thereof, and the photosensitive resin being cured by light and being configured to adjustably position the guide socket with respect to a tooth mold, and the guide socket being tubular shaped and being formed with an opening at at least at a top thereof, and two opposing guide slots are formed on two opposing respective opened side edges of the guide socket for communicating with the opening, and a bottom portion of each of the two opposing guide slots is formed with a receiving portion;

a positioning shaft formed with a cap part and a shaft and being socketed into the guide socket, and the shaft penetrating the guide socket to extend through an opened bottom thereof, wherein a diameter of the cap part is greater than a diameter of the shaft, the positioning shaft being further formed with a receiving element extending radially from the shaft to terminate below a surface of the receiving portion of each of the two opposing guide slots, and a connecting part is formed between a bottom surface of each receiving portion and a corresponding top section of the receiving element for extending parallelly with respect to the shaft, and wherein the receiving element is disk shaped; and at least one positioning part disposed within the guide socket to extend radially between a tubular wall section thereof and the cap part of the positioning shaft for stably positioning the positioning shaft with respect to the guide socket.

2. The one-piece dental implant guide pack based on photocuring molding according to claim 1, wherein the guide socket further includes at least one positioning element disposed at the outer edge thereof.

3. The one-piece dental implant guide pack based on photocuring molding according to claim 2, wherein the at least one positioning element is convex arc shaped.

4. The one-piece dental implant guide pack based on photocuring molding according to claim 2, wherein the at least one positioning element includes multiple positioning elements, and the multiple positioning elements are arranged in an array at the outer edge of the guide socket.

5. The one-piece dental implant guide pack based on photocuring molding according to claim 1, wherein the guide socket is round tubular shaped.

6. The one-piece dental implant guide pack based on photocuring molding according to claim 1, wherein the cap part of the positioning shaft is round tabular shaped.

7. The one-piece dental implant guide pack based on photocuring molding according to claim 1, wherein the at least one positioning part is stripe shaped.

8. The one-piece dental implant guide pack based on photocuring molding according to claim 1, wherein the at least one positioning part extends to a portion of the tubular wall section of the guide socket located adjacent to the guide slot and further extends to a side edge of the cap part of the positioning shaft.

\* \* \* \* \*